June 25, 1968  J. L. DOOLEY  3,389,694
EXHAUST CHARGED INTERNAL COMBUSTION ENGINE
Filed March 14, 1967  6 Sheets-Sheet 1
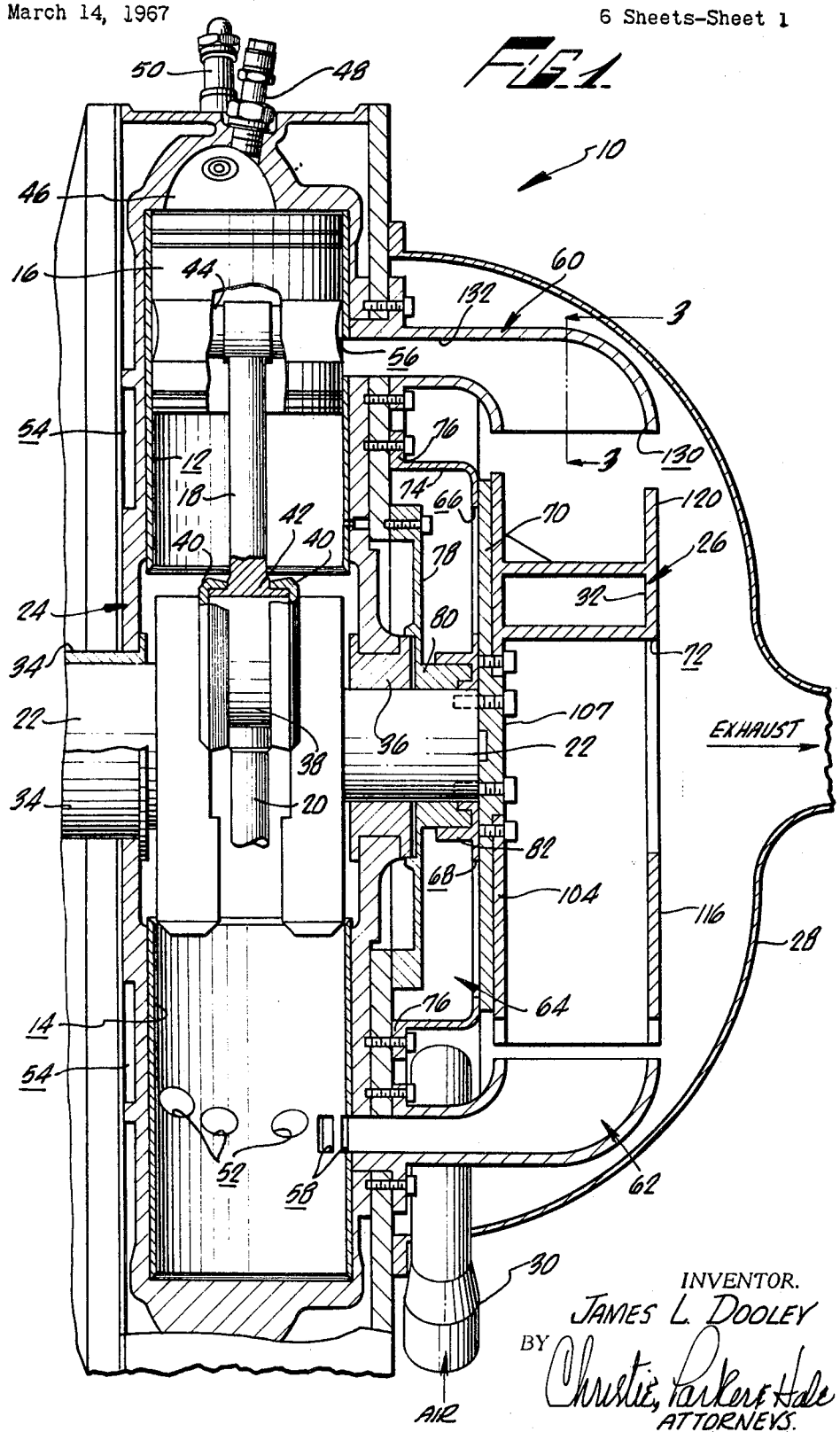
INVENTOR.
JAMES L. DOOLEY
BY Christie, Parker & Hale
ATTORNEYS.

June 25, 1968  J. L. DOOLEY  3,389,694
EXHAUST CHARGED INTERNAL COMBUSTION ENGINE
Filed March 14, 1967  6 Sheets-Sheet 2

INVENTOR.
JAMES L. DOOLEY
BY
Christie, Parker & Hale
ATTORNEYS.

June 25, 1968 J. L. DOOLEY 3,389,694
EXHAUST CHARGED INTERNAL COMBUSTION ENGINE
Filed March 14, 1967 6 Sheets-Sheet 3
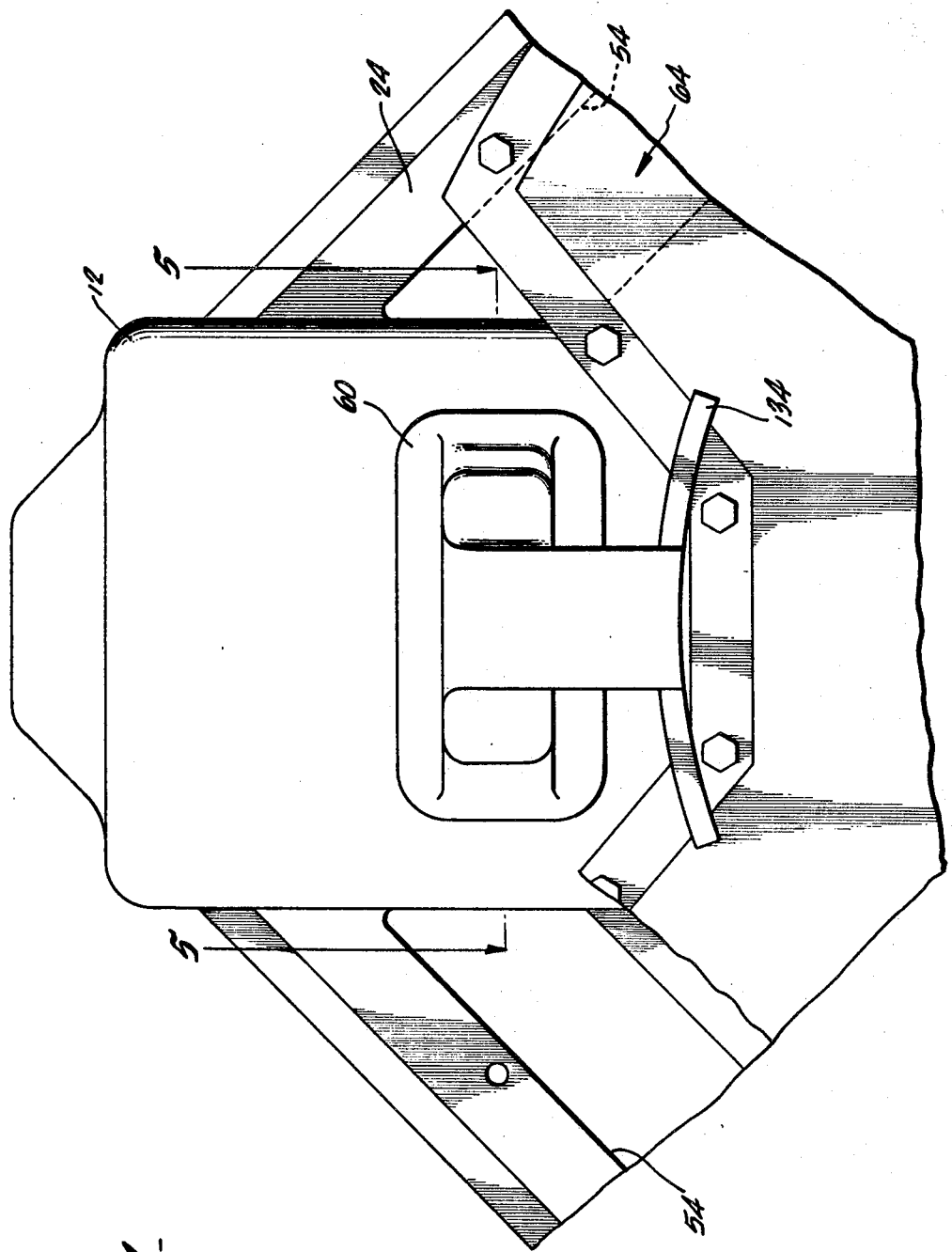
INVENTOR.
JAMES L. DOOLEY
BY
Christie, Parker & Hale
ATTORNEYS.

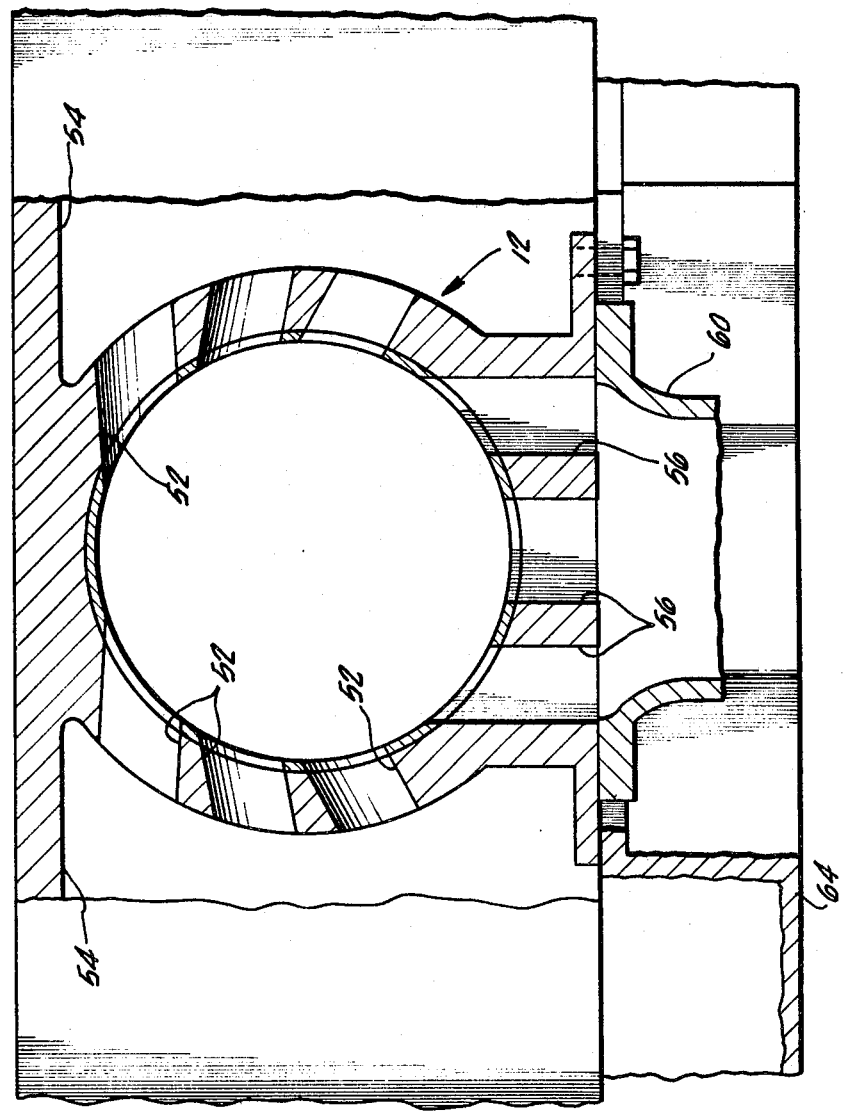

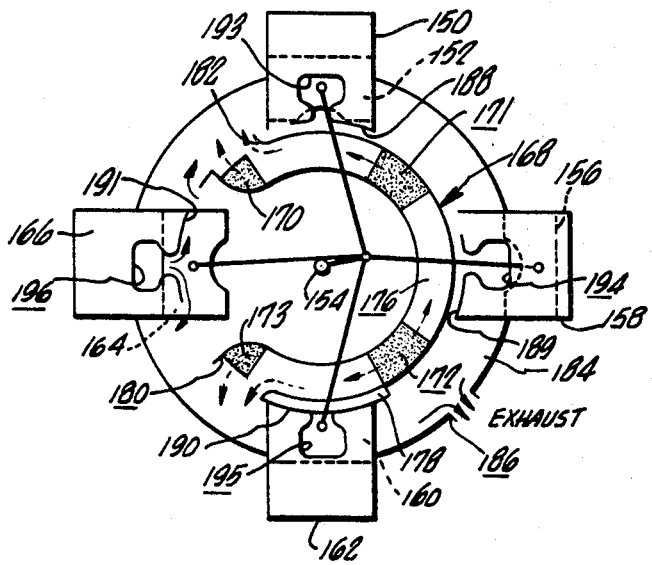
FIG_6
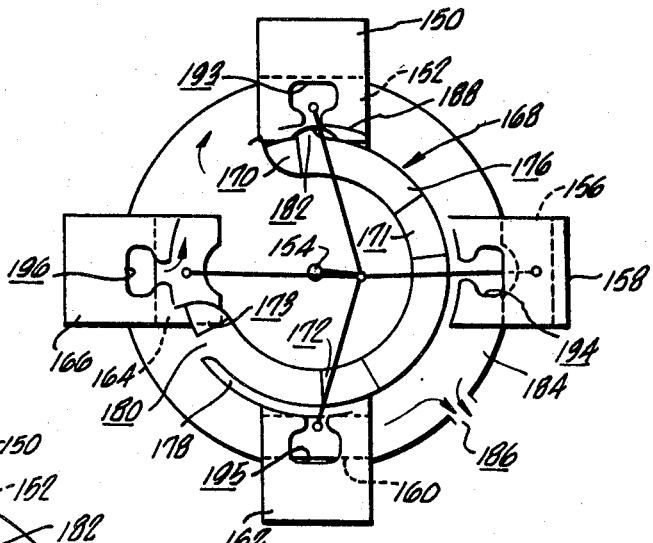
FIG_7
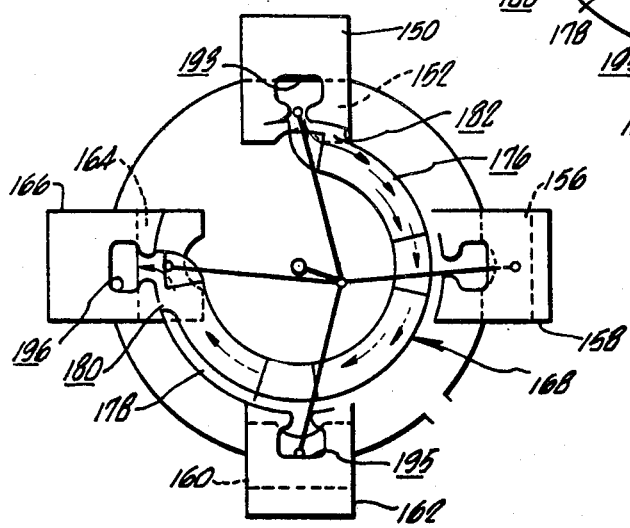
FIG_8
INVENTOR.
JAMES L. DOOLEY
BY Christie, Parker & Hale
ATTORNEYS.

June 25, 1968  J. L. DOOLEY  3,389,694
EXHAUST CHARGED INTERNAL COMBUSTION ENGINE
Filed March 14, 1967  6 Sheets-Sheet 6
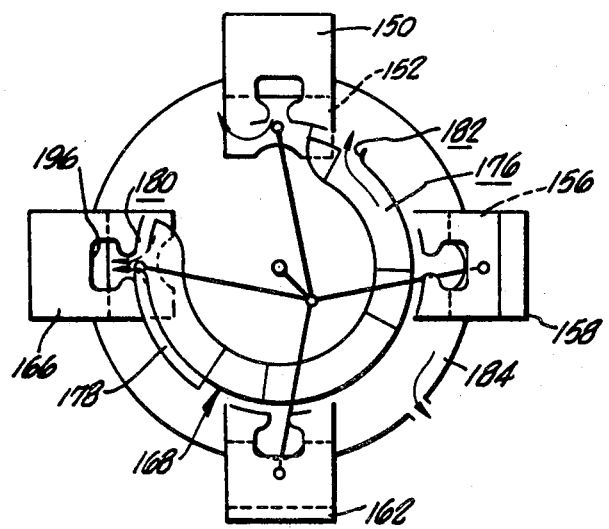
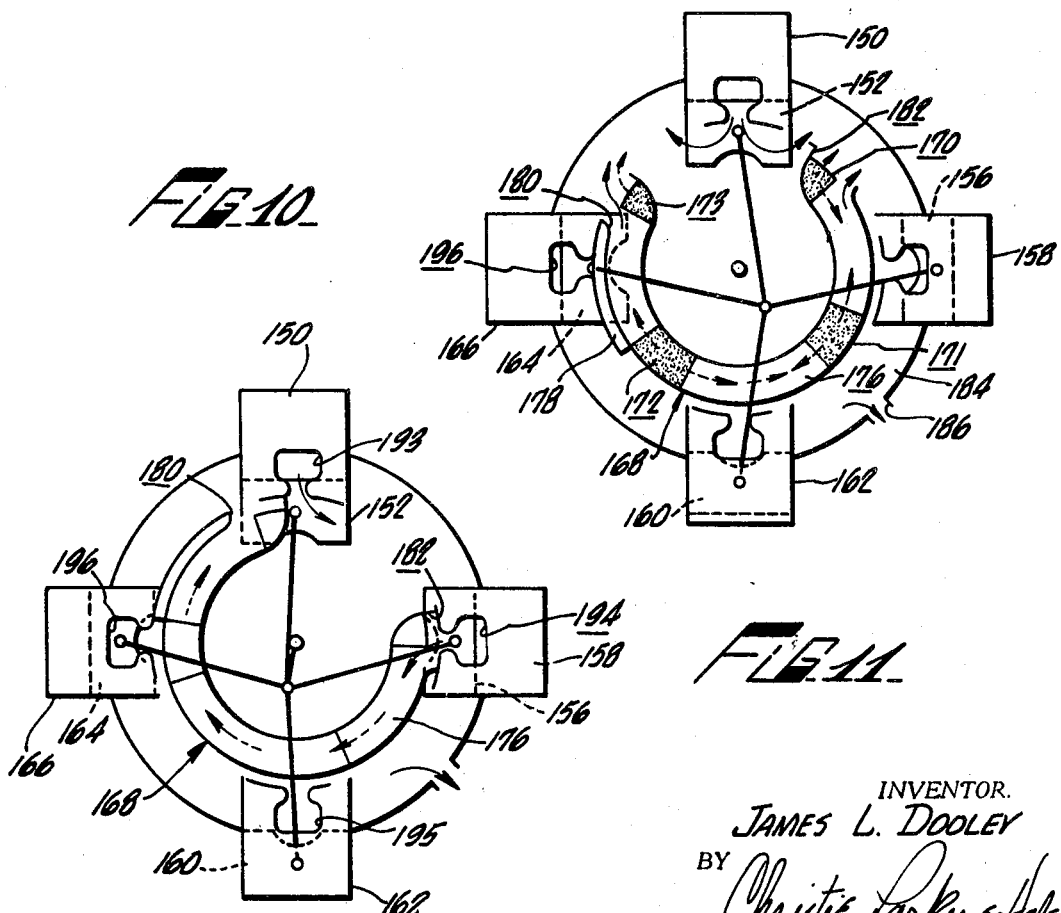
INVENTOR.
JAMES L. DOOLEY
BY Christie, Parker & Hale
ATTORNEYS.

United States Patent Office 3,389,694
Patented June 25, 1968

3,389,694
EXHAUST CHARGED INTERNAL COMBUSTION ENGINE
James L. Dooley, Santa Monica, Calif., assignor to McCulloch Corporation, Los Angeles, Calif., a corporation of Wisconsin
Filed Mar. 14, 1967, Ser. No. 623,064
27 Claims. (Cl. 123—65)

ABSTRACT OF THE DISCLOSURE

An internal combustion engine which uses the exhaust energy of one cylinder to charge another cylinder with air during the inlet portion of the latter's cycle. A duct filled with fresh air communicates the exhaust ports of two cylinders with the exhaust of one cylinder forcing the air through the exhaust port of the other cylinder. The duct is mounted to effect this exhaust port communication between each cylinder in the exhaust portion of its cycle and each cylinder in the inlet portion of its cycle.

BACKGROUND OF THE INVENTION

This invention relates to the art of internal combustion engines and in particular to an engine which effects the charging of its cylinder with air by the exhaust products of other cylinders.

Reciprocating internal combustion engines employ expanding products of combustion as their source of power. These products must be exhausted from the engine after they have performed their useful work. Optimum engine design requires the products of combustion to be exhausted before all their useful energy is extracted. In a two-cycle internal combustion engine, for example, the products are usually removed while they retain an appreciable amount of energy to allow expansion through an exhaust port to atmosphere.

Various efforts have been employed in the past to use the energy of exhaust products to increase the efficiency or output of an internal combustion engine. One such effort has materialized into what is known in the art as the Comprex system. This system is described in the June 1947 issue of Aviation. The Comprex system employs a rotor having a multiplicty of individual cells disposed about its cylindrical periphery. Each cell acts alternately as a compression and an expansion chamber for air and exhaust gases. The exhaust gases are used to establish a series of compression and expansion waves which increase the pressure of inlet air prior to its introduction through the inlet port of a cylinder of an internal combustion engine. The exhaust products are discharged when they are at a low point of a pressure wave by incoming ambient air. The Comprex device is complicated because of its requirement for a great number of rotating cells. In addition, the device is limited because of the critical placing and sizing of various of its parts. For example, stationary valve plates must be disposed with respect to incoming air and exhaust products to establish the required cascading of pressure and expansion waves for compression of the air charge. Other attempts to employ exhaust gas energy have been directed to expanding the exhaust products in a turbine to supercharge an engine's incoming air. The latter systems are expensive, complicated and bulky.

SUMMARY OF THE INVENTION

The present invention provides a duct which communicates cylinders when at least one cylinder is in the exhaust portion of its cycle and at least one other cylinder is in the intake portion of its cycle. The exhaust products of one cylinder are used to compress a charge of fresh air in the duct for introduction into the cylinder undergoing the inlet portion of its cycle.

In one form, the invention contemplates an internal combustion engine which has a plurality of reciprocating pistons disposed in a corresponding number of cylinders. As in all internal combustion engines, air inlet means are provided for each cylinder, for example, an inlet port which is periodically opened and closed by its piston or a cam actuated inlet valve. Exhaust means are provided for each cylinder, such as an exhaust port disposed in its cylinder wall for operation by the cylinder's piston. The cylinders are arranged with a firing order requiring at least one cylinder to be in the exhaust portion of its cycle while another cylinder is in the inlet portion of its cycle. It is these two cylinders or series of cylinders which are communicated by the duct. In brief, the duct is in the form of a tube that has two open ends with one end constituting an exhaust gas inlet while the other end is an air discharge outlet. The exhaust gas inlet receives exhaust gas products from a cylinder which creates a pressure wave that compresses and introduces air through the air discharge outlet into the complementary cylinder. Means are provided, such as a sliding plate valve, for introducing air into the duct between successive communications of the exhaust gas inlet with the exhaust of a cylinder. The duct is operatively coupled to the engine's crankshaft to maintain desired timing. The coupling may be provided by mounting the duct directly to the engine's crankshaft, or, if necessary, through a series of gears. Means are provided to remove exhaust products from the duct after they have compressed and discharged the air. Preferably, these residual exhaust products are removed by having the exhaust gas inlet and air discharge outlet open to atmosphere between successive exhaust charges, and employing the air which is admitted through the sliding plate valve to drive the exhaust products out through these openings. An exhaust gas collector or manifold may be employed to collect and direct the exhaust from the engine.

The duct is ideally suited for air charging cylinders through the cylinders' exhaust ports. The air compressed by the exhaust products from one cylinder's exhaust port is introduced into a complementary cylinder's exhaust port for subsequent use in the combustion process. The air thus introduced maintains the exhaust ports at a temperature considerably lower than would be the case without the cooling action of the incoming air. Fuel consumption is also improved by ramming unburned fuel back into the cylinder through its exhaust port.

The exhaust gas charging of inlet air is especially useful in two-cycle, radially opposed, compression-ignition engines. In a four-cylinder engine of this type, for example, the firing sequence and exhaust port arrangement is such that the duct may take a very simple form. The exhaust ports have equal circumferential spacing and occupy a common plane equidistant from the engine's axial centerline. Each exhaust port is adapted with a passage which opens radially inward at a point along an imaginary circle. The duct is mounted on the engine's crankshaft with the air discharge outlet and exhaust gas inlet opening radially outward into the imaginary circle. The firing sequence for this type of engine is such that 90-degree, spaced-apart cylinders find one cylinder in its exhaust stage while the other cylinder is in the inlet portion of its cycle. The air discharge outlet and exhaust gas inlet of the duct are, therefore, approximately 90 degrees apart. To effect a substantial air charge and to aid in its dynamic balance, the duct is formed as an approximately 270-degree section of a torus centered about the centerline of the engine. Air is introduced into the duct through an air box by a sliding valve arrangement which effects the introduction of air between successive registrations of the exhaust gas inlet with an exhaust port adapter passage. The air box also serves to supply combustion and scavenge air to the cylinders in a normal manner. The air introduced through the sliding valve cooperates with the exhaust gas inlet and air discharge outlet to purge the duct of exhaust products after they have served in the compression and introduction of an air charge.

The present invention offers a simple and expedient way of increasing the mass charge in a cylinder through the use of the energy of the exhaust products of another cylinder. Moreover, when the charge air passes through an exhaust port, the invention provides a means for maintaining the port at a relatively low temperature. In two-cycle engines, fuel consumption is improved because fuel discharged out the exhaust port is rammed back into the cylinder by the incoming air charge from the duct. Because power is extracted from the exhaust gas, the engine will be markedly quieter in operation.

These and other features, aspects and advantages of the present invention will become more apparent from the following description, appended claims and drawings.

BRIEF DESCRIPTION OF THE FIGURES

FIGURE 1 is a partial elevational view, in half section, of a preferred embodiment of the instant invention;

FIGURE 4 is a partial plan view of a cylinder of the engine shown in FIGURE 1;

FIGURE 5 is a sectional view taken along line 5—5 of FIGURE 4 showing the interior of a cylinder shown in FIGURE 1; and FIGURES 6 through 11 illustrate schematically the operation of the embodiment illustrated in the previous figures.

DESCRIPTION OF THE PREFFERED EMBODIMENTS

Figure 3:
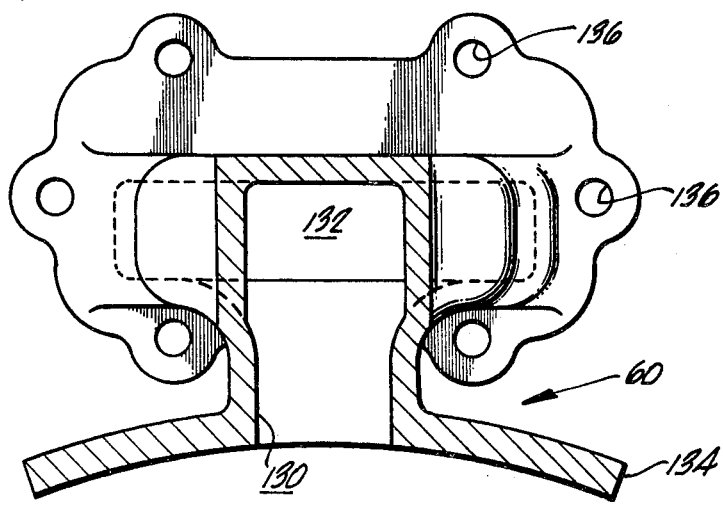
FIGURE 3 is a sectional view taken along line 3—3 of FIGURE 1 of a preferred exhaust passage.

FIGURE 1 depicts in half section a four-cylinder, radially opposed, two-cycle engine which is denoted in general by reference numeral 10. The engine has four cylinders defined by cylindrical liners, two of which are shown by reference numerals 12 and 14. Each of these cylinders contains a piston such as piston 16 in cylinder 12. The pistons are reciprocally connected to crankshaft 22 by four connecting rods of which connecting rods 18 and 20 are shown. Crankshaft 22 is journaled for rotation in block 24 in bearings 34 and 36. Duct assembly 26 is attached to crankshaft 22. Exhaust gas collector 28 collects and discharges exhaust gas products from the engine. Air is supplied to the engine through air pipe 30 which may be in communication with a supercharger (not shown). Duct assembly 26 operates to receive exhaust gas products from each cylinder and to compress with these products a charge of fresh air for introduction into a cylinder undergoing the inlet portion of its cycle. For this purpose, duct 32 is provided.

Crank pin 38 reciprocally drives connecting rods 18 and 20 and their connected pistons. The connecting rods are held in place by annular flanges 40 which are disposed at the ends of crank pin 38. Flange 42 on the end of connecting rod 18 slidably engages flange 40 for the constraint of the rod and piston 16. The other connecting rods are mounted in a similar fashion. The upper end of connecting rod 18 receives wrist pin 44 which is held in piston 16 in a standard manner. Combustion chamber 46 is disposed above piston 16 in cylinder 12. Spark plug 48 and injector 50 are in communication with combustion chamber 46 for the ignition of a fuel-air charge and the introduction of fuel, respectively. A portion of the engine's operating air is introduced through inlet ports 52, shown in cylinder 14, which are in communication with air passage 54. Exhaust ports 56 and 58 open respectively into cylinders 12 and 14 for the removal of products of combustion from these cylinders. These exhaust ports open into exhaust port adapter passages 60 and 62 which alternately communicate with duct 32 and the interior of exhaust collector 28.

Air pipe 30 is in communication with the interior of air box 64 which forms an annular distribution passage about crankshaft 22 for the distribution of air to duct 32 of duct assembly 26 and the inlet ports of the various cylinders. Air communication to duct 32 is provided through a plurality of openings, two of which are shown by reference numerals 66 and 68. Valve plate 70 is mounted for rotation with duct assembly 26 and determines the timing of air passing from air box 64 into duct 32. Duct assembly 26 and valve plate 70 are mounted through fasteners to crankshaft 22 for rotation. Centrally disposed access hole 72 in duct assembly 26 provides the means for gaining access to fasten or to remove the assembly from crankshaft 22. Air box 64 is formed from two annular parts. Cover piece 74 has a radially extending flange 76 for the mounting of the cover to block 24. Backing plate 78 of air box 64, also mounted to the block, has a lower annular flange 80 in which is journaled a portion of the crankshaft 22. Flange 82 of cover 74 overlaps flange 80 of backing plate 78 to provide an air seal.

Figure 2:
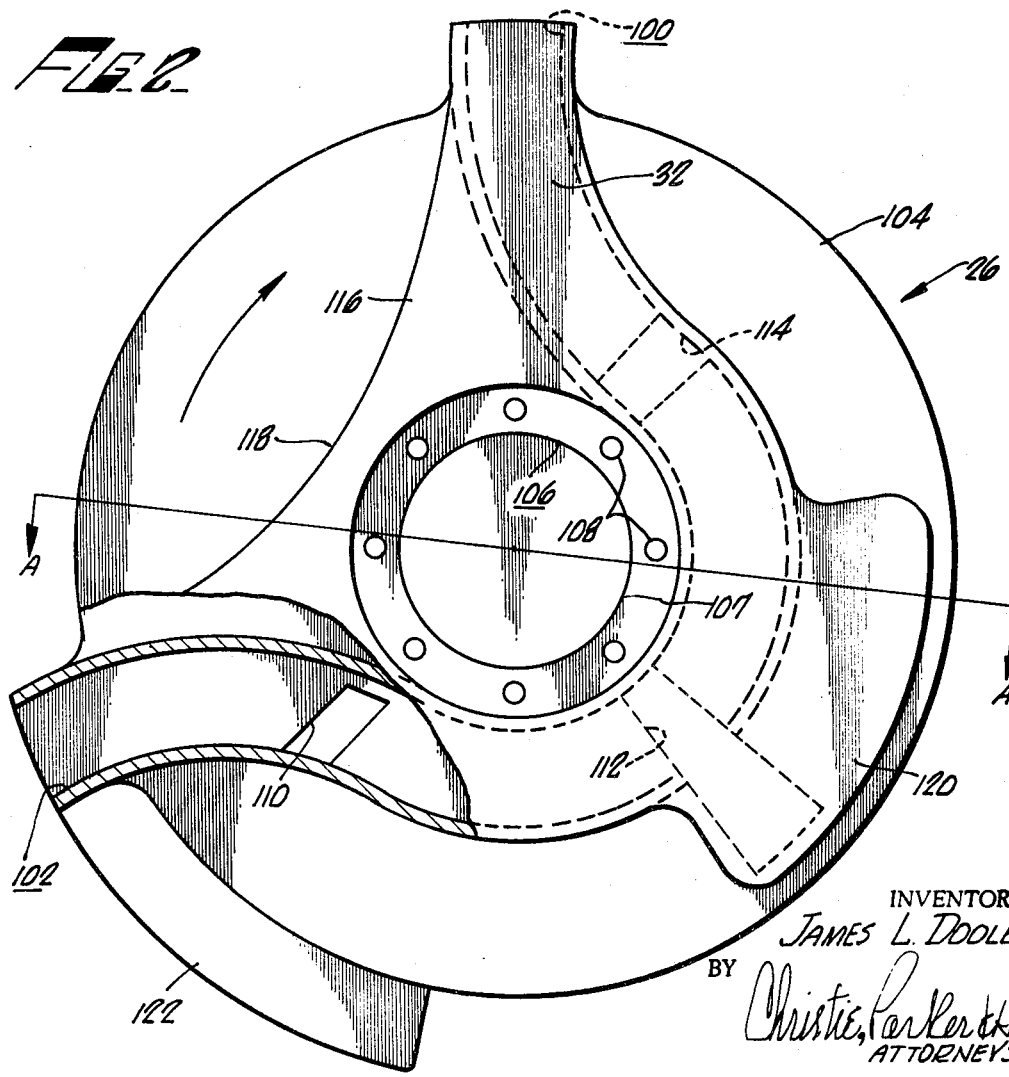
FIGURE 2 is a plan view, partly in section, of the duct used in the embodiment shown on FIGURE 1.

FIGURE 2 illustrates more clearly the configuration of duct assembly 26 which is shown in half section in FIGURE 1 along line A—A of FIGURE 2. Duct 32 is generally bell shaped with a cylindrical midsection that flares out into two radially extending legs. One of these legs terminates at radial exhaust gas inlet 100 while the other leg opens radially at air discharge outlet 102. Exhaust gas inlet 100 and air discharge outlet 102 are at an equal radial distance from the axis of rotation of duct assembly 26 and crankshaft 22. The duct is mounted on annular base plate 104 which has a centrally disposed opening 106 that receives hub 107 of valve plate 70. The hub is shown most clearly in FIGURE 1. Fastener holes 108 are disposed in a circle in plate 104 for the fasteners which hold duct assembly 26 to valve plate 70. Apertures 110, 112 and 114 open into duct 32 and extend through valve plate 70. These apertures periodically register with openings 66 and 68, as well as a third opening, not shown, to effect air communication between duct 32 and air box 64. The duct is capped by cover 116 which has an arcuate, inwardly disposed surface 118 between exhaust gas inlet 100 and air discharge outlet 102. Cover 116 includes counterweight 120 outwardly of the central portions of duct 32. This weight provides dynamic balance for duct assembly 26. Rotating valve 122 is mounted on base plate 104 rearwardly of air discharge outlet 102. The rotating valve prevents the loss of charge air from the cylinders until the exhaust ports are closed by the pistons.

FIGURE 3 illustrates in greater detail exhaust port adapter passage 60. The passage has a central aperture 130 which opens radially inward for communication with exhaust gas inlet 100. Aperture 130 opens at right angles into duct portion 132 which in turn is in communication with the exhaust ports of one cylinder of the engine. Skirt 134 is disposed on either side of aperture 130 to guide rotary valve 122 and provide a seal for the retention of air in each cylinder when its exhaust port is open and following an air charge through duct 32. Fastener holes 136 in exhaust port adapter passage 62 are for the mounting of the passage to the engine.

FIGURES 4 and 5 illustrate the mounting of exhaust port adapter passage 60 on cylinder 12 and the manner in which air box 64 communicates with inlet ports 52 of the cylinders. For purposes of clarity, the cover plate between air box 64 and block 24 which covers air passage 54 is not shown. Air box 64 has a radial extension between each of the cylinders for communication with air passages 54 in block 24. Air passages 54 extend to the casting which surrounds the cylinder defining liners. Inlet ports 52, on two sides of cylinder 12, open into air passages 54 for the admission of combustion air. This air, during the appropriate portion of the cylinder's cycle, also scavenges exhaust products from within the cylinder through exhaust ports 56 for ultimate discharge through exhaust collector 28 to atmosphere. The inlet and exhaust ports of each cylinder are actuated by the cylinder's piston in a standard manner.

FIGURES 6 through 11 inclusive show schematically the operation of the internal combustion engine of this invention. For purposes of clarity, many parts which are not necessary in the understanding of the operation have been omitted. These figures also show a slight modification in the manner of introducing air into duct 176, corresponding to duct 32 in the previous figures, wherein there are four instead of three air introduction ports into the duct. The direction of crankshaft rotation is clockwise. The uppermost cylinder in the four-cylinder radial engine illustrated is denoted by reference numeral 150 and will be taken as the reference cylinder. FIGURE 6 shows a crankshaft angle of 80 degrees after top dead center for piston 152 in cylinder 150. FIGURE 7 shows the disposition of duct assembly 168 with respect to the cylinders when the crankshaft angle is 95 degrees after top dead center for piston 152. FIGURE 8 shows the engine with a crankshaft angle of 110 degrees after top dead center for piston 152. FIGURES 9 through 11 show crankshaft angles for piston 152 of 135 degrees after top dead center, 145 degrees after top dead center, and 190 degrees after top dead center, respectively.

Piston 152 is disposed in cylinder 150 and is connected through a connecting rod to crankshaft 154. In like manner piston 156 is disposed in cylinder 158; piston 160 is disposed in cylinder 162; and piston 164 is disposed in cylinder 166. Duct assembly 168 is coupled for rotation to crankshaft 154. The duct assembly has four air inlet openings, 170 through 173, for the admission of air into duct 176. Rotating valve 178 is disposed in rotation sense behind air discharge outlet 180. Exhaust gas inlet 182 is disposed at the end of duct 176 which is opposite air discharge outlet 180. Exhaust collector 184 is disposed with respect to the cylinders and the duct assembly to collect and discharge exhaust through outlet 186. Each cylinder has a skirt, shown by reference numerals 188 through 191, and an exhaust port denoted by reference numerals 193 through 196. In each of these figures, the flow of fresh air is shown by the dashed arrows and that of the exhaust by solid arrows. The passing of air through air passages 170 through 173 is shown when it occurs by the stipple in FIGURES 6 and 10.

In FIGURES 6, duct 176 is receiving fresh air through air passages 170 through 173. This fresh air circulates throughout the duct to scavenge exhaust products out through exhaust gas inlet 182 and air discharge outlet 180 where they collect in exhaust collector 184 for discharge through outlet 186. Except for the air used to purge duct 176 of exhaust products, the air admitted through air passages 170 through 173 constitutes the charge of fresh air which will be introduced into cylinder 166. Piston 152 is in its power stroke, thus cylinder 150 contains expanding products of combustion. Cylinder 158 has finished the air inlet portion of its cycle and its contained charge is nearing ignition. Piston 160 is beginning to compress a charge of fresh air in preparation for ignition. Exhaust port 195 of cylinder 162 is still open to the interior of the cylinder but is closed to atmosphere by rotating valve 178. Cylinder 166 is out of communication entirely with duct 176. Piston 164 of cylinder 166 is approaching bottom dead center. Residual exhaust products within cylinder 166 are being scavenged by air admitted through the cylinder's air inlet ports, the latter being described with reference to the previous figures and therein indicated by reference numeral 52.

In FIGURE 7, duct 176 is completely filled with fresh, cool air. Air passages 170 through 173 are no longer in communication with duct 176. Exhaust gas inlet 182 is beginning to pass over skirt 188 for communication with exhaust port 193. Air discharge outlet 180 is open to exhaust collector 184. Piston 152 remains in its power stroke but is uncovering exhaust port 193 for the discharge of exhaust products into duct 176. The charge in cylinder 158 is undergoing ignition with piston 156 slightly past its top dead center point. Piston 160 in cylinder 162 is compressing a fresh charge and has almost closed exhaust port 195 thereby trapping a supercharged air mass within the cylinder. Because exhaust port 195 is about to close, rotary valve 178 begins to uncover the port. Cylinder 166 is still in the scavenging portion of its cycle.

In the disposition shown in FIGURE 8, exhaust ports 193 and 196 of cylinders 150 and 166 are in communication through duct 176. Thus, exhaust gas inlet 182 is in registration with exhaust port 193 while air discharge outlet 180 is registered with exhaust port 196. Piston 152 has just uncovered exhaust port 193 to admit exhaust gasses to duct 176. Piston 164, while ascending, has not yet closed exhaust port 196. Thus, cylinder 150 is experiencing a major blowdown of combustion products while generating a pressure wave which travels at the speed of sound through duct 176 towards cylinder 166. The pressure wave compresses the fresh air in duct 176 which is trapped because exhaust gas inlet 182 and air discharge outlet 180 are no longer open to collector 184. The compressed air is forced into exhaust port 196 to augment air admitted through the cylinder's inlet ports. Piston 156 is in its power stroke in cylinder 158 while piston 160 in cylinder 162 is in its compression stroke. Exhaust passage 195 of cylinder 162 is filled with fresh air which cools the passage.

In FIGURE 9, cylinder 150 is finishing the scavenging portion of its cyle with air admitted through its standard inlet ports. Exhaust gas inlet 182 of duct 176 is opening to exhaust collector 184. Cylinder 166 is now experiencing the full effect of the pressure wave which was generated in duct 176 by the exhaust from cylinder 150; thus, cylinder 166 is still being charged with fresh air through air discharge outlet 180. Rotary valve 178 is about to close exhaust port 196 to trap the newly constituted air charge in cylinder 166. Piston 156 of cylinder 158 remains on its power stroke while the charge in cylinder 162 approaches its ignition point.

In FIGURE 10, duct 176 is beginning to be flushed or scavenged by fresh air admitted through air passages 170 through 173 which have rotated into registration with the openings in air box similar to air box 64 described previously. The exhaust products are being carried into exhaust collector 184 by the fresh air for discharge through exhaust outlet 186. Thus, both air discharge outlet 180 and exhaust gas inlet 182 are effectively open to atmosphere. Cylinder 150 is in the terminal stage of the scavenging portion of its cycle with the air being admitted through its standard inlet ports. Piston 152 is nearing its bottom dead center position. Piston 156 in cylinder 158 is in its power stroke. Piston 160 is in its compression stroke, nearing top dead center, for the ignition of the charge in cylinder 162. Piston 164 in cylinder 166 is beginning its compression stroke and closing exhaust port 196. To maintain the charge of fresh air within cylinder 166, rotating valve 178 is in position to close exhaust port 196 from atmosphere.

FIGURE 11 illustrates the beginning of a new air charge cycle with different cylinders. Duct 176 is charged with fresh air with exhaust gas inlet 182 is registration with exhaust port 194 of cylinder 158. Piston 156, under the influence of expanding exhaust gases, is in its power stroke and has just uncovered a portion of exhaust port 194. Exhaust port 194, therefore, is in communication with the duct 176 for the latter's receipt of exhaust gases. These exhaust gases create a pressure wave which travels at the speed of sound to compress the fresh air charge within the duct and force it into a cooperating exhaust port of another cylinder. Thus, air discharge outlet 180 is beginning to register with exhaust port 193 of cylinder 150. This port is open for the admission of a charge because piston 152 is barely past its bottom dead center point. Piston 160 is undergoing the initial stages of its power stroke as ignition has taken place. Exhaust port 195 of cylinder 162, therefore, remains closed by piston 160. Cylinder 166 is in the compression portion of its cycle with exhaust valve 196 closed by piston 164.

The subject invention has been described with reference to certain preferred embodiments. It is not intended, however, that the spirit and scope of the appended claims be necessarily limited to this description.

What is claimed is:

1. In combination with an internal combustion engine having a plurality of reciprocating pistons disposed in a corresponding number of cylinders, air inlet means for introducing air into each cylinder, exhaust means for discharging products of combustion from each cylinder, and a crankshaft connecting the pistons to maintain a selected firing order with at least one cylinder exhausting gas while at least one other cylinder is receiving a charge of fresh air, an improvement in the means for introducing air into each cylinder which comprises:

(a) a duct operatively coupled to the crankshaft having:
 (i) at least one exhaust gas inlet which is capable of exhaust gas communication with the exhaust means of each cylinder to receive a charge of exhaust gas therefrom,
 (ii) at least one air discharge outlet which is capable of discharging a charge of fresh air into to the air inlet means of each cylinder when such cylinder is in the air inlet portion of its cycle and the duct is receiving exhaust gases from each cylinder which is in the exhaust portion of its cycle; and
(b) means for introducing air into the duct before the duct receives exhaust gases such that at least a portion of this air is forced by these exhaust gases as the charge of fresh air through the air discharge outlet and into the air inlet means.

2. The improvement claimed in claim 1 including means for removing residual exhaust gases from the duct between each successive charge of exhaust gas.

3. The improvement claimed in claim 2 wherein the exhaust gas removal means includes the exhaust gas inlet and air discharge outlet, the exhaust gas inlet and air discharge outlet being open to atmosphere between their respective communications with the exhaust means and the air inlet means of the cylinders.

4. The improvement claimed in claim 3 wherein the exhaust gas removal means includes the duct air introduction means, such air introduction means being operable to scavenge the duct to substantially replace exhaust gases with air at least a portion of which constitutes the charge of fresh air.

5. The improvement claimed in claim 4 wherein the exhaust gas inlet and the air discharge outlet are disposed in relation to each other such that the exhaust gas inlet is capable of beginning its communication with the exhaust means of each cylinder before the air discharge outlet is in communication with the air inlet means of each cylinder in the air inlet portion of its cycle and of terminating such exhaust gas communication while the air discharge outlet is in communication with the air inlet means of each cylinder in the air inlet portion of its cycle.

6. The improvement claimed in claim 2 wherein the air inlet means for each cylinder includes such cylinder's exhaust means, the air discharge outlet being operable to discharge the charge of fresh air into such exhaust means during the air inlet portion of such cylinder's cycle.

7. The improvement claimed in claim 6 wherein the exhaust gas removal means includes the exhaust gas inlet and air discharge outlet, such inlet and outlet being capable of discharging exhaust gas from the duct between their respective communications with the exhaust means and the exhaust means acting as an air inlet.

8. The improvement claimed in claim 7 wherein the exhaust gas inlet and the air discharge outlet are disposed such that exhaust gas communication between the exhaust means and the exhaust gas inlet is begun before the fresh air charge communication with the exhaust means of each cylinder undergoing the air inlet portion of its cycle, such exhaust gas communication being maintained for at least a portion of the duration of fresh air charge communication between the air discharge outlet and the exhaust means of each cylinder undergoing the air inlet portion of its cycle.

9. The improvement claimed in claim 8 wherein the exhaust gas inlet and air discharge outlet are disposed with respect to each other such that exhaust gas communication between the exhaust gas inlet and the exhaust means is terminated before the termination of fresh air communication between the air discharge outlet and the exhaust means of each cylinder undergoing the air inlet portion of its cycle.

10. The improvement claimed in claim 9 wherein the exhaust gas removal means includes the duct air introduction means, such air introduction means being operable to scavenge the duct to substantially replace exhaust gases with air, the latter constituting the charge of fresh air.

11. In combination with a two-cycle internal combustion engine having a plurality of cylinders, air inlet means for each cylinder, exhaust means for each cylinder, a crankshaft and a cycle sequence wherein there is at least one cylinder in the exhaust portion of its cycle while at least one other cylinder is in the intake portion of its cycle, an improvement in the means for introducing air into each cylinder which comprises:

(a) a duct operatively coupled to the crankshaft having:
 (i) at least one exhaust gas inlet disposed to communicate with the exhaust means of each cylinder during the exhaust portion of such cylinder's cycle to receive a charge of exhaust gas,
 (ii) at least one air discharge outlet disposed to communicate with the inlet means of each cylinder during the inlet portion of such cylinder's cycle to discharge a charge of air thereinto;
(b) means for introducing air into the duct before the duct receives exhaust gases such that at least a portion of this air is forced by these exhaust gases as the charge of air through the air discharge outlet and into the air inlet means; and
(c) means for removing residual exhaust gases from the duct between each successive charge of exhaust gas.

12. The improvement claimed in claim 11 wherein the air inlet means for each cylinder includes such cylinder's exhaust means, the air discharge outlet being operable to discharge the charge of air into such exhaust means during the inlet portion of such cylinder's cycle.

13. The improvement claimed in claim 12 wherein the air inlet means for each cylinder includes, in addition to such cylinder's exhaust means, at least one inlet port.

14. The improvement claimed in claim 13 wherein:
(a) the exhaust means of each cylinder and the exhaust gas inlet of the duct are disposed and arranged for the termination of exhaust gas communication with each other while the exhaust means remains open to the interior of such cylinder; and
(b) the inlet port of such cylinder is disposed to remain open after such termination of exhaust gas communication to cooperate with such exhaust means to scavenge the interior of such cylinder.

15. The improvement claimed in claim 14 wherein the exhaust gas removal means includes the exhaust gas inlet and air discharge outlet, the exhaust gas inlet and air discharge outlet being open to atmosphere between their respective communications with the exhaust means and the air inlet means of the cylinders.

16. In combination with a two-cycle, radial internal combustion engine having a plurality of reciprocating pistons disposed in a corresponding number of equally spaced-apart cylinders, a crankshaft connecting the pistons to maintain a selected firing order with each cylinder in the exhaust portion of its cycle having a corresponding cylinder in the inlet portion of its cycle to constitute a cylinder pair, each cylinder pair having the same angular displacement as each other cylinder pair, and at least one exhaust port for each cylinder with the exhaust ports being equidistant from the axis of rotation of the crankshaft, an improvement in the means for introducing air into each cylinder which comprises:
 (a) a duct coupled for rotation with the crankshaft having:
  (i) an exhaust gas inlet which is capable of exhaust gas communication with the exhaust ports of each cylinder in the exhaust portion of its cycle to receive a charge of exhaust gas therefrom,
  (ii) an air discharge outlet which is capable of air communication with the exhaust ports of the cylinder which forms the cylinder pair with the cylinder in exhaust gas communication with the exhaust gas inlet while such last mentioned cylinder is in exhaust gas communication with the exhaust gas inlet to discharge a charge of fresh air into such exhaust ports;
 (b) means for introducing air into the duct before the duct receives exhaust gases such that at least a portion of this air constitutes the charge of fresh air; and
 (c) means for removing exhaust gases from the duct between each successive charge of exhaust gas.

17. The improvement claimed in claim 16 wherein the exhaust gas removal means includes the exhaust gas inlet and air discharge outlet, the exhaust gas inlet and air discharge outlet being open to atmosphere between their respective communications with the exhaust ports of each cylinder pair.

18. The improvement claimed in claim 17 wherein the exhaust gas removal means includes the duct air introduction means, such air introduction means being operable to scavenge the duct to substantially replace exhaust gases with air at least a portion of which constitutes the charge of fresh air.

19. The improvement claimed in claim 18 including at least one inlet port for each cylinder.

20. The improvement claimed in claim 19 wherein:
 (a) the exhaust ports of each cylinder and the exhaust gas inlet of the duct are disposed in relation to each other to terminate exhaust gas communication while such exhaust ports remain open to the interior of such cylinder; and
 (b) the inlet ports of such cylinder are disposed to remain open after such termination of exhaust gas communication to cooperate with such exhaust ports to scavenge the interior of such cylinder.

21. The improvement claimed in claim 20 wherein the duct air introduction means includes an air box in communication with the inlet ports of each cylinder and the duct, the communication with duct being between successive exhaust gas discharges into the duct.

22. The improvement claimed in claim 21 wherein:
 (a) the duct is mounted to the crankshaft outside the air box; and
 (b) the duct air introduction means includes at least one opening in the air box and at least one opening in the duct disposed in relation to each other to register between successive exhaust gas discharges into the duct.

23. The improvement claimed in claim 22 wherein the exhaust gas inlet and air discharge outlet are disposed with respect to each other such that exhaust gas communication between the exhaust gas inlet and exhaust ports of one cylinder of a cylinder pair is terminated before the termination of air communication between the air discharge outlet and the exhaust ports of the other cylinder of the cylinder pair.

24. The improvement claimed in claim 22 including:
 (a) an exhaust port adapter for each cylinder's exhaust ports defining a passage which opens radially inwardly of the engine at a point along an imaginary circle; and wherein
 (b) the exhaust gas inlet and air discharge outlet open radially outwardly at the imaginary circle, the communication between the exhaust gas inlet, air discharge outlet and the exhaust ports being through the passages of the exhaust port adapters.

25. The improvement claimed in claim 24 including a sliding valve mounted on the duct behind the air discharge outlet in position to register with the opening of the exhaust port adapter to prevent the escape of an air charge from a cylinder which has received such a charge from the duct.

26. The improvement claimed in claim 25 wherein each exhaust port adapter has a skirt on either side of its opening to guide the sliding valve.

27. The improvement claimed in claim 26 wherein the exhaust gas inlet and air discharge outlet are disposed with respect to each other such that exhaust gas communication between the exhaust gas inlet and the exhaust port adapter passage of one cylinder of a cylinder pair is terminated before the termination of air communication between the air discharge outlet and the exhaust port adapter passage of the other cylinder of the cylinder pair.

References Cited
UNITED STATES PATENTS

| | | | |
|---|---|---|---|
| 1,804,321 | 5/1931 | Crowe | 123—65 |
| 2,134,920 | 11/1938 | Kadency | 123—65 |
| 2,369,245 | 2/1945 | Nesfield | 123—65 |
| 2,431,266 | 11/1947 | Mansfield et al. | 123—65 |
| 2,476,816 | 7/1949 | Carter | 123—65 |
| 2,800,120 | 7/1957 | Jendrassik | 123—65 |
| 3,254,484 | 6/1966 | Kopper | 123—65 XR |
| 3,312,205 | 4/1967 | Ehrlich | 123—65 |

WENDELL E. BURNS, *Primary Examiner.*